United States Patent
Black et al.

[11] Patent Number: 6,161,888
[45] Date of Patent: Dec. 19, 2000

[54] HIGH SPEED GRIPPER ASSEMBLY FOR USE IN AUTOMATED TAPE LIBRARIES

[75] Inventors: David C. Black, Thornton; Joseph P. Manes, Arvada; Daniel J. Plutt, Superior, all of Colo.

[73] Assignee: Storage Technology Corporation, Louisville, Colo.

[21] Appl. No.: 09/213,006

[22] Filed: Dec. 16, 1998

[51] Int. Cl.[7] ................................ B25J 15/08
[52] U.S. Cl. ........................ 294/116; 901/38; 901/39
[58] Field of Search ........................ 294/86.4, 99.1, 294/100, 103.1, 104, 106, 115, 116, 119.1, 88; 279/114; 414/753, 932; 901/36, 38, 39

[56] References Cited

U.S. PATENT DOCUMENTS

| | | | |
|---|---|---|---|
| 3,202,449 | 8/1965 | Lemelson | 294/88 |
| 5,054,836 | 10/1991 | Schulz | 294/116 |
| 5,253,911 | 10/1993 | Egan et al. | |
| 5,588,796 | 12/1996 | Ricco et al. | |
| 5,601,391 | 2/1997 | Gazza | |
| 5,639,041 | 6/1997 | Wada | 294/116 X |
| 5,659,434 | 8/1997 | Yamakawa et al. | |
| 5,691,859 | 11/1997 | Ulrich et al. | |
| 5,848,872 | 12/1998 | Manes et al. | 294/116 X |
| 5,895,084 | 4/1999 | Mauro | 294/116 X |
| 5,966,266 | 10/1999 | Kato et al. | |

FOREIGN PATENT DOCUMENTS

| | | |
|---|---|---|
| 0 834 382 A2 | 4/1998 | European Pat. Off. |
| 01 182957 | 10/1989 | Japan |
| 10 188416 | 10/1998 | Japan |

*Primary Examiner*—Johnny D. Cherry
*Attorney, Agent, or Firm*—Brooks & Kushman P.C.

[57] ABSTRACT

A compact high speed gripper assembly includes a simple design with minimal components while providing flexibility for grasping variously sized cartridges. The gripper assembly includes a frame, a rotary solenoid secured to the frame, and first and second gripper jaws movably connected to the frame for movement in opening and closing directions for gripping a cartridge. Each gripper jaw includes a cam surface formed thereon. First and second followers are driven by the rotary solenoid and engaged with the respective cam surface for actuating jaw movement. The first and second gripper jaws are spring-biased toward each other to provide a gripping force for gripping the cartridge

16 Claims, 6 Drawing Sheets

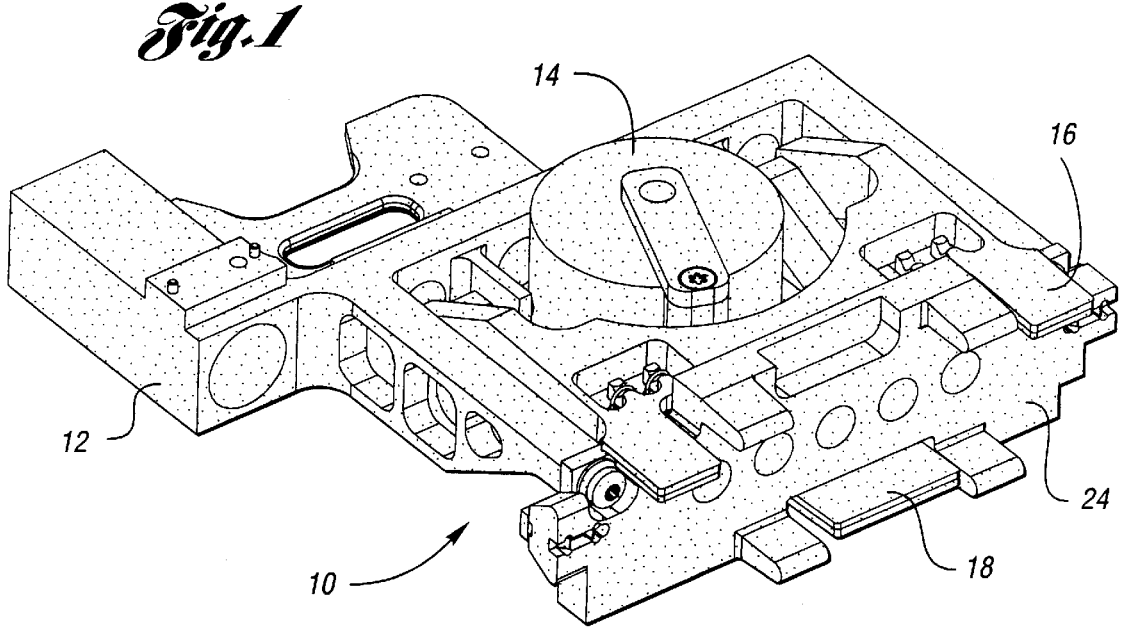
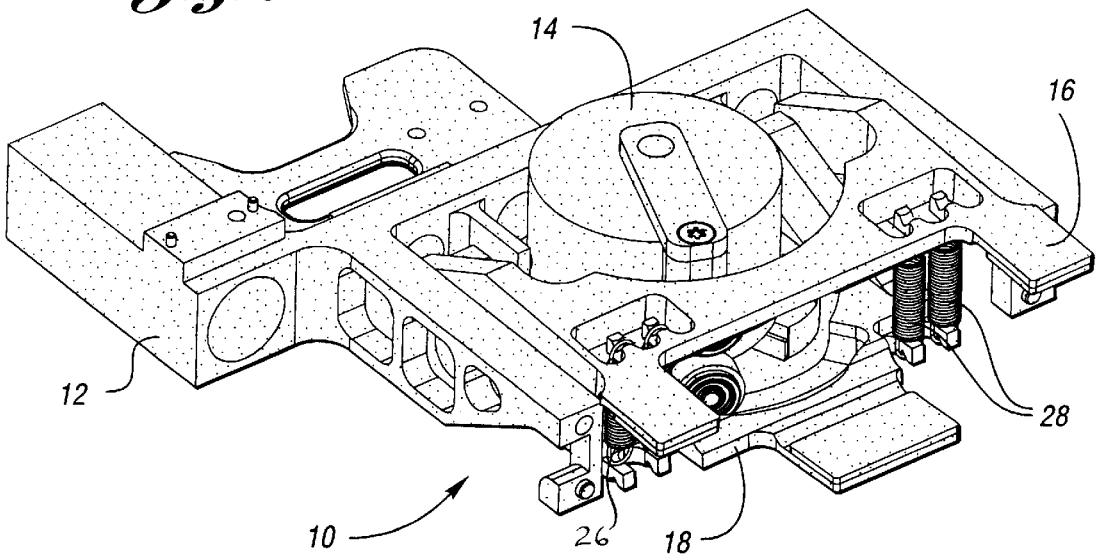

HIGH SPEED GRIPPER ASSEMBLY FOR USE IN AUTOMATED TAPE LIBRARIES

TECHNICAL FIELD

The present invention relates to a gripper apparatus including movable jaws having cam surfaces driven by a rotary solenoid for grasping a media cartridge in a robot-controlled media library of a data processing system.

BACKGROUND ART

Gripper assembly designs for automated tape libraries have traditionally been lacking in one or more of the following areas: reliability, cost size, speed, simplicity, and flexibility. U.S. Pat. No. 5,253,911, assigned to the assignee of the present invention, provided an improvement over prior art gripper assemblies by providing a servomotor-driven belt which actuates a rotary can mechanism, which drives a pair of cam followers for pivoting a scissors-type mechanism for opening and closing the gripper jaws. The servomotor design is subject to improvement because it requires control logic and continuous power. If power is lost, the system does not know the position of the jaws when power is returned, which may cause further delay.

It is desirable to provide an improved gripper assembly in which operating speed is improved, size is reduced, the number of components is reduced, and the servomotor is eliminated.

DISCLOSURE OF INVENTION

The present invention provides an improved gripper assembly for use in an automated library system in which reliability, cost, size, speed, complexity and flexibility are improved. A gripper jaw mechanism has cam paths integral therewith which are driven by a high speed rotary drive member, such as a rotary solenoid. The gripper jaws are spring-loaded in a closing direction so that the solenoid need not be powered for grasping a cartridge.

More specifically, the present invention provides a gripper assembly including a frame, a rotary solenoid secured to the frame, and first and second gripper jaws movably connected to the frame for movement in opening and closing directions for gripping an object. Each gripper jaw includes a cam surface. First and second followers are driven by the rotary solenoid and engaged with the respective cam surface for actuating jaw movement. The first and second gripper jaws are spring-biased toward each other to provide a gripping force for gripping the object.

The overall thickness of the assembly is less than 2 inches. The rotar solenoid and cam drive provide closing and opening motion in 30 milliseconds Additionally, the rotary solenoid is simply an on/off device which does not require control logic or continuous power. The assembly does not include belt drives or additional components. Additionally, when power is lost, the gripper jaws are returned to a known position—the closed position, which is not the case with the use of a servomotor. The spring clamping force enables grasping of variously size cartridges.

Accordingly, an object of the present invention is to provide an improved gripper assembly for an automated tape library system which provides improved reliability, cost, size, speed, simplicity, and flexibility.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 1 shows a perspective view of a gripper assembly in accordance with the present invention with the gripper jaws in the open position;

FIG. 2 shows a perspective view of the gripper assembly of FIG. 1 with the face plate removed;

BEST MODE FOR CARRYING OUT THE INVENTION

Figure 3:
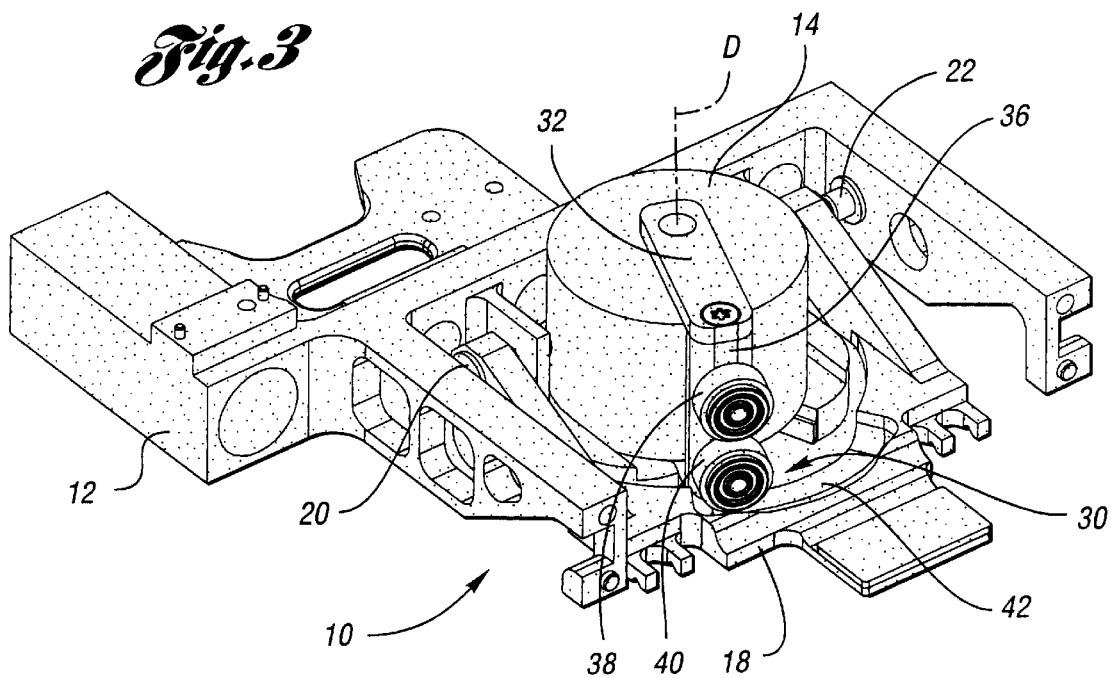
FIG. 3 shows a perspective view of the gripper assembly of FIG. 2 with the upper gripper jaw and springs removed.

Referring to FIGS. 1–3, a gripper assembly 10 is shown in accordance with the present invention. The gripper assembly 10 includes a movable hand frame 12, a rotary solenoid 14 connected to the hand frame 12, and a pair of gripper jaws 16,18 pivotally connected to the frame 12 at the pivot joints 20,22 along a common pivot axis. The gripper jaws 16,18 may be movably connected to the frame in any known manner, but are preferably pivotally connected as shown.

With the face plate 24 removed, as shown in FIG. 2, the spring 26,28 are visible. The springs 26,28 bias the first and second gripper jaws 16,18 toward each other in a closing direction for gripping cartridges. Of course, the springs 26,28 could be rotary springs or tension springs, and could be placed or attached in a variety of configurations. Additionally, only one spring is necessary.

Figure 4:
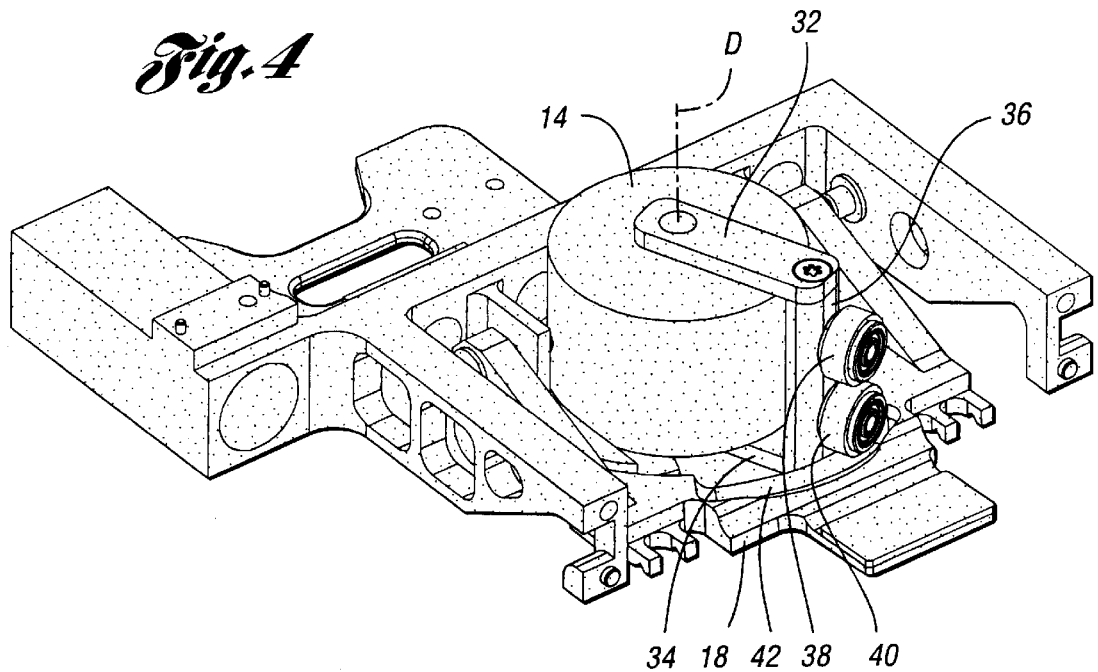
FIG. 4 shows a perspective view of the gripper assembly of FIG. 3 with the cam followers in the closed position.

With the first jaw 16 and springs 26,28 removed, as shown in FIGS. 3 and 4, the cam assembly 30 is visible. As shown in FIGS. 3 and 4, the rotary solenoid 14 includes first and second arms 32,34 operatively connected to opposing ends of the rotary solenoid 14 (of course, one movable arm 32,34 and one stationary arm would be sufficient), and a follower support rod 36 connected between ends of the first and second arms 32,34 for carrying first and second followers (rollers) 38,40. As visible in FIGS. 3 and 4, follower 40 rolls against the cam track 42 formed in the second gripper jaw 18. A cam track (not shown) is formed in the first gripper jaw 16, similar to cam track 42, for engaging the follower 38.

When the rotary solenoid 14 is energized from the position shown in FIG. 4, the first and second arms 32,34 are caused to pivot about the drive axis D, which causes movement of the arms 32,34 from the position shown in FIG. 4 to the position shown in FIG. 3. As this pivotal movement occurs, follower 40 follows along the cam track 42, and follower 38 follows another cam track formed in the first gripper jaw 16. The contour of the cam tracks 42 causes the gripper jaws 16,18 to move away from each other as the followers 38,40 roll across the cam tracks 42. In the position shown in FIG. 3, the gripper jaws 16,18 are in the open position for retrieving cartridges.

Accordingly, the rotary solenoid 14 is operative to move the first and second gripper jaws 16,18 in the opening direction when energized, and the spring bias provided by the springs 26,28, shown in FIG. 2, is operative to close the jaws 16,18 to secure the cartridge between the first and second gripper jaws 16,18 when the solenoid 14 is de-energized. The rotary solenoid 14 also includes an internal rotary return spring to assist in returning the solenoid in a direction corresponding with the closing direction. However, this rotary return spring is not necessary when the springs 26,28 are used.

The rotary solenoid 14 is a high speed solenoid operative to open the first and second gripper jaws 16,18 in approximately 30 milliseconds.

Figure 5:
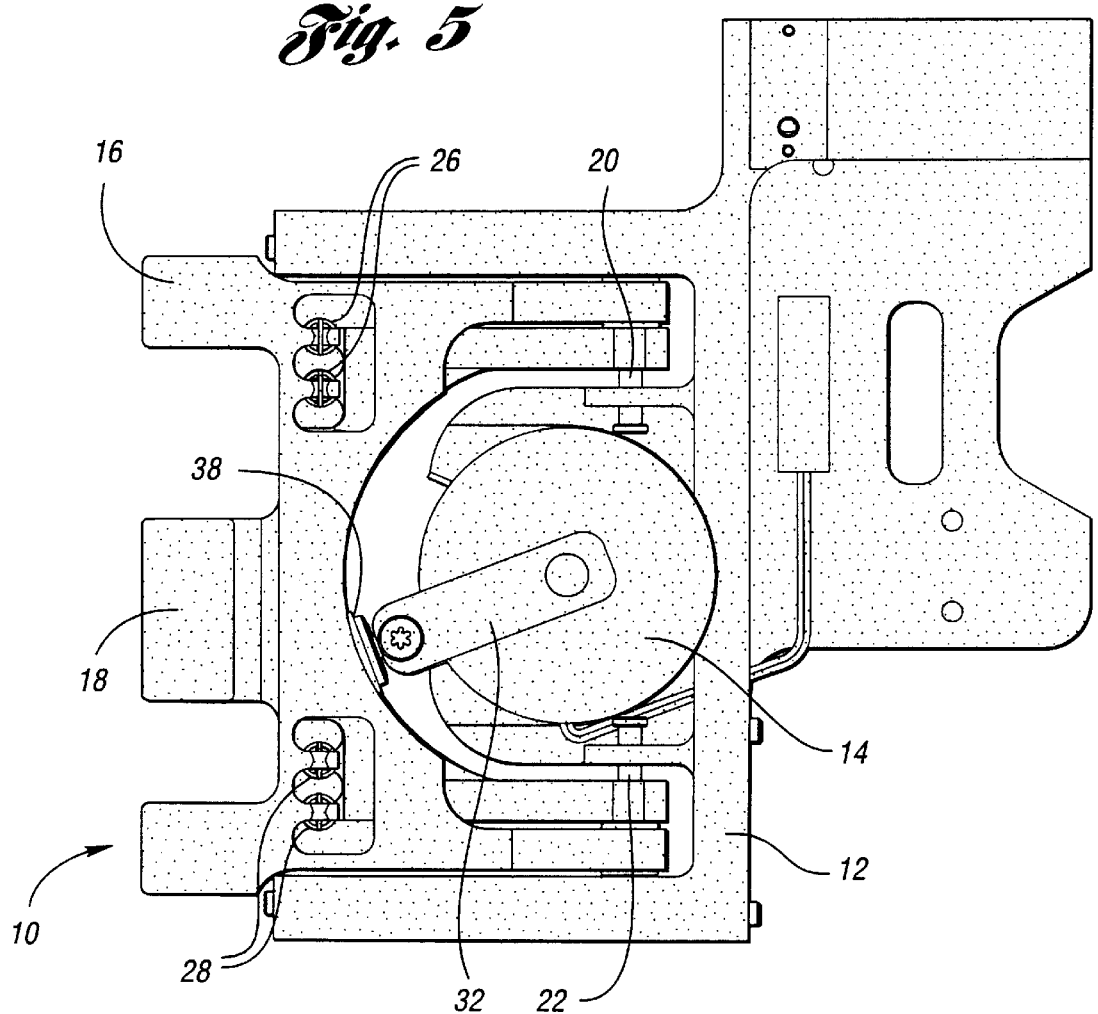
FIG. 5 shows an overhead plan view of the gripper assembly of FIG. 2 with the fingers in the closed position.
Figure 6:
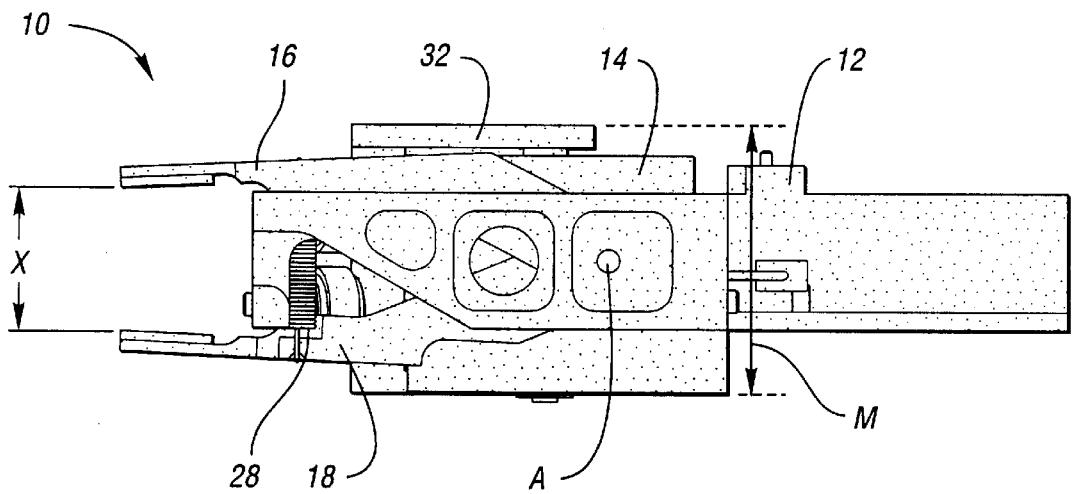
FIG. 6 shows a side view of the gripper assembly of FIG. 5 with the gripper jaws in the closed position.

FIGS. 5 and 6 show a plan view and side view, respectively, of the gripper assembly 10 of FIG. 2 with the gripper jaws 16,18 in the closed position. As shown, in the closed position of FIG. 6, the gripper jaws 16,18 have a separation distance X and in the open position a separation distance Y, shown in FIG. 8. In this manner, a significant range of cartridge sizes may be grasped. As illustrated in FIG. 6, the gripper assembly 10 has a total thickness M of approximately 1.5 inches, and preferably less than 2 inches for storage and packaging considerations.

Figure 7:
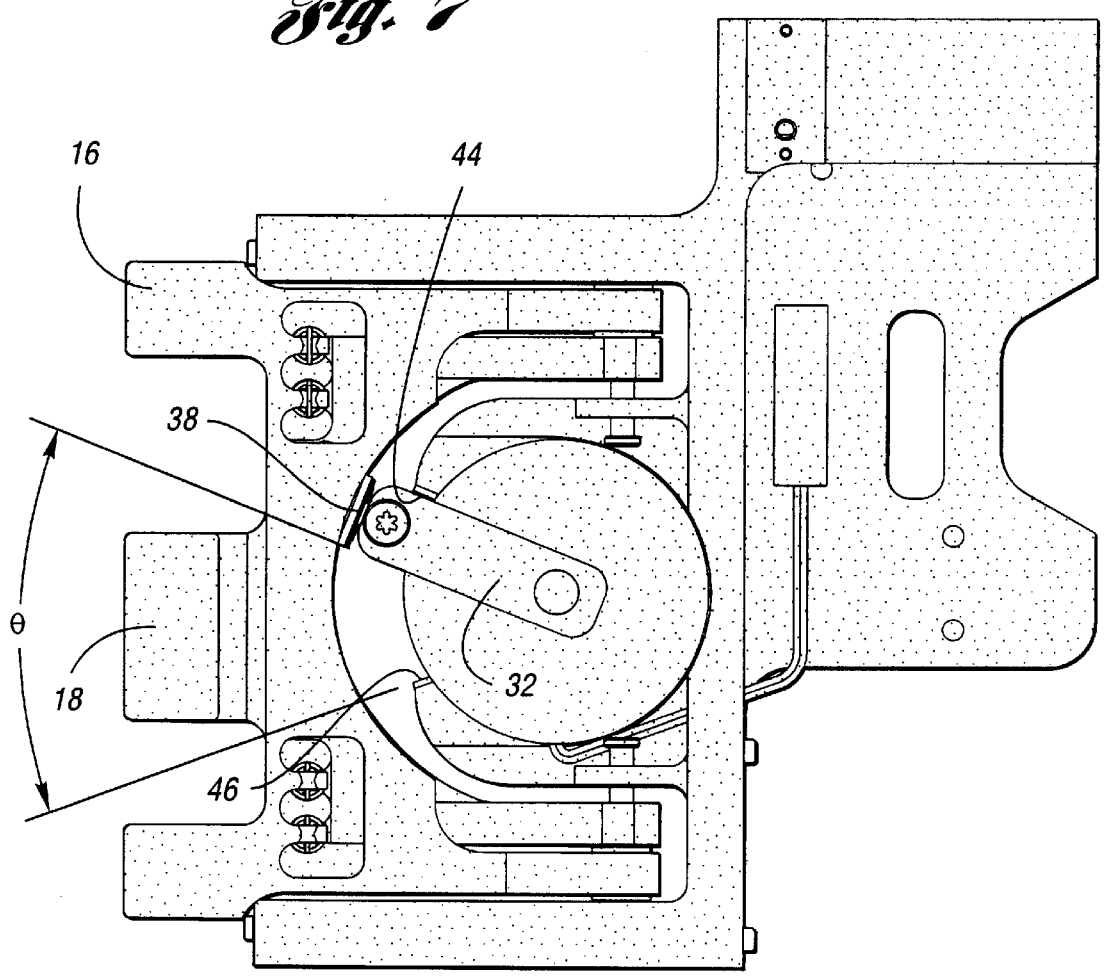
FIG. 7 shows a plan view of the gripper assembly of FIG. 2 with the gripper jaws in the open position.
Figure 8:
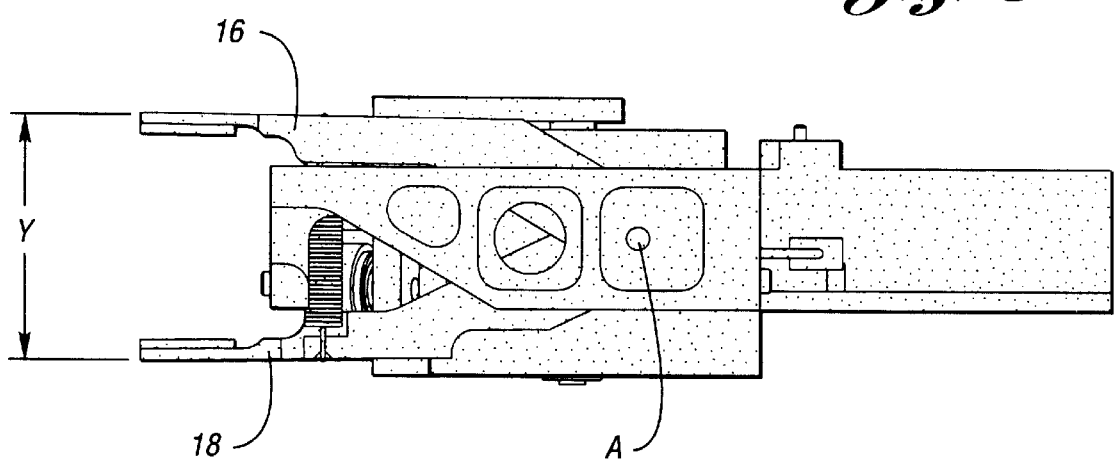
FIG. 8 shows a side view of the gripper assembly of FIG. 7.

FIGS. 7 and 8 illustrate a plain view and side view, respectively, of the gripper assembly shown in FIG. 5, with the solenoid 14 energized, and the gripper jaws 16,18 in the open position for retrieving a cartridge. As illustrated by the angle θ shown in FIG. 7, the follower 38 and first arm 32 may be pivoted through a pivotal range of approximately 42° between the open and closed positions. In the respective fully open and fully closed positions, the arm 34 engages the stops 44,46, respectively. As further illustrated in FIGS. 6 and 8, the gripper jaws 16,18 are pivotable along a common axis A.

Figure 9:
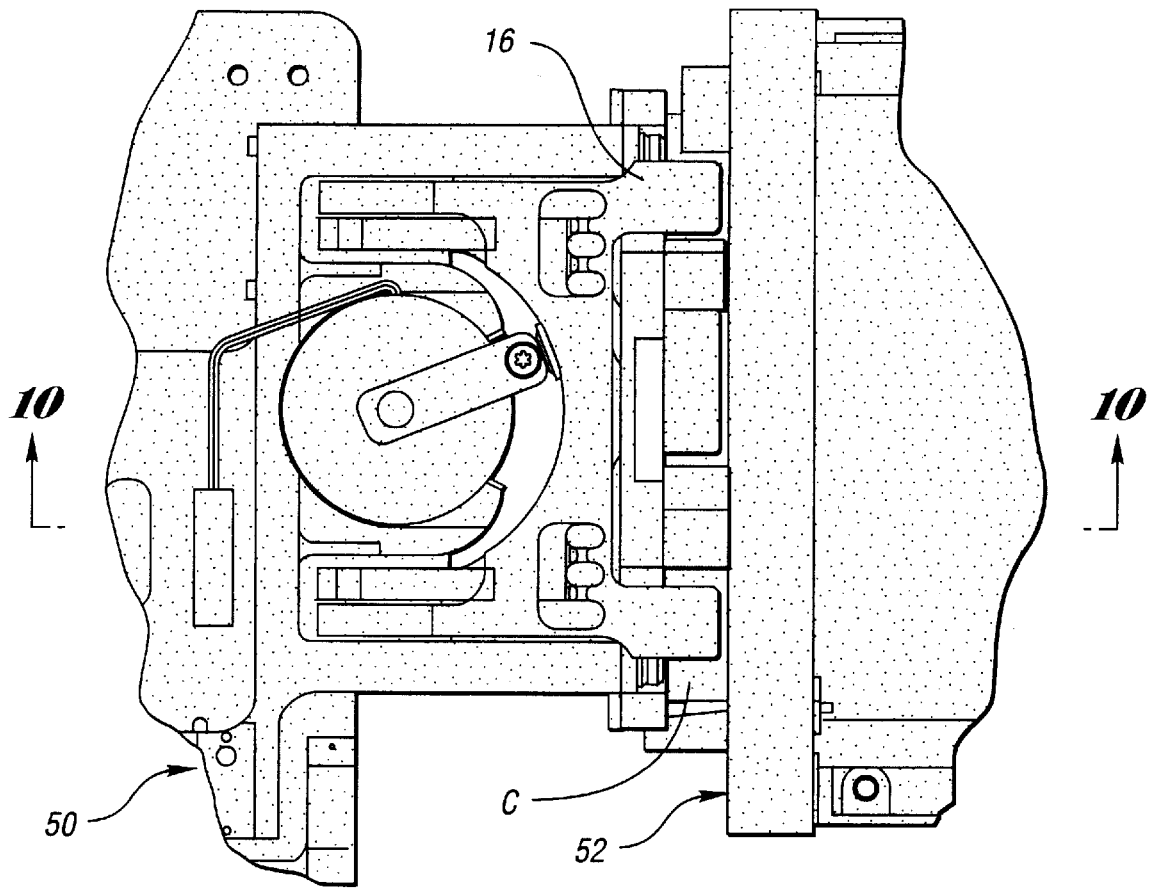
FIG. 9 shows a partially cut-away overhead view of the gripper assembly of FIG. 1 retrieving a cartridge from a tape drive.
Figure 10:
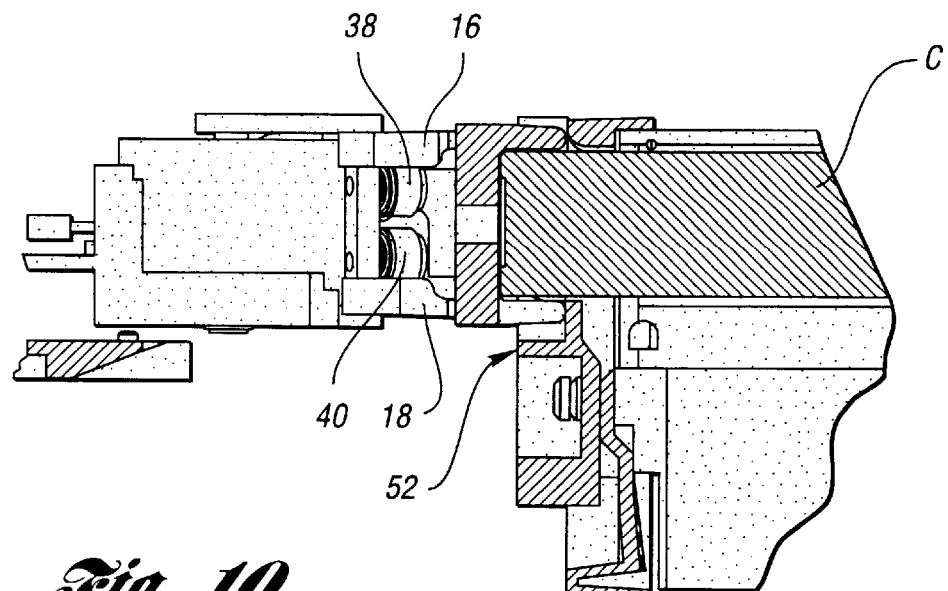
FIG. 10 shows a cut-away sectional view taken at line 10—10 FIG. 9.
Figure 11:
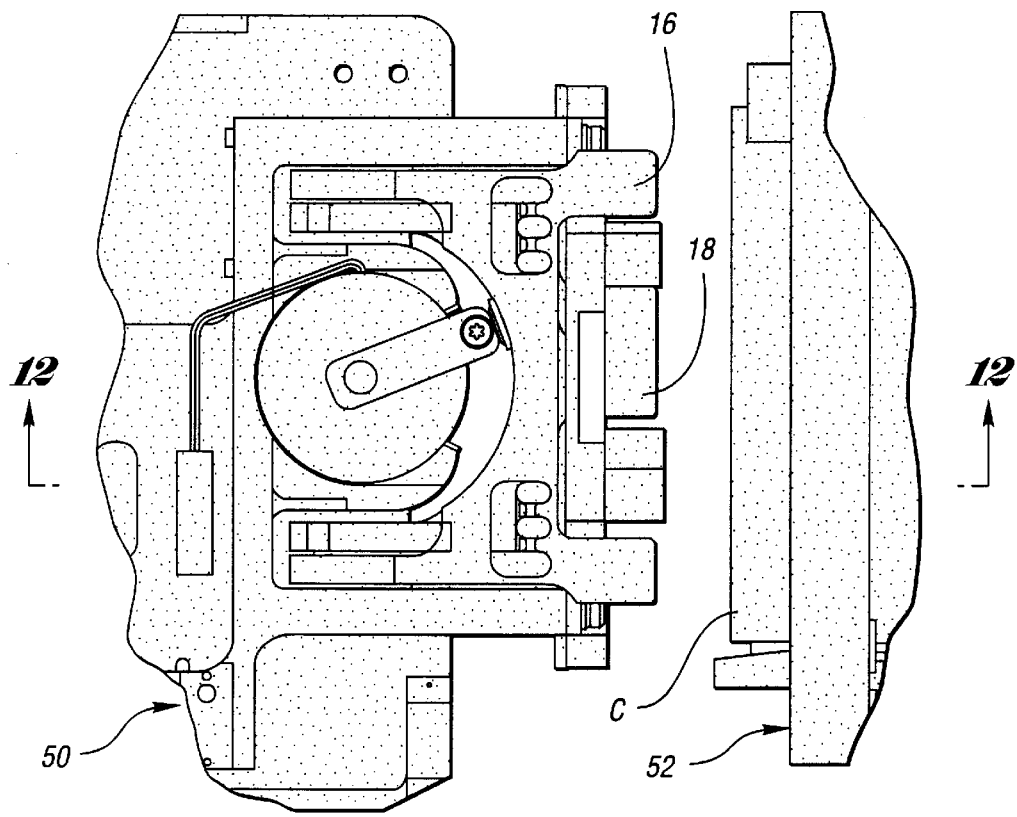
FIG. 11 shows a cut-away overhead plan view of the cartridge assembly of the present invention approaching a tape drive.
Figure 12:
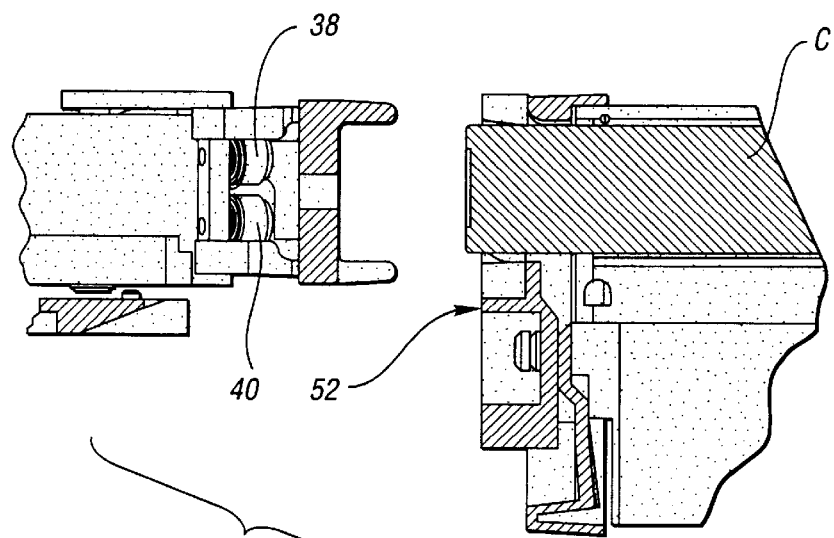
FIG. 12 shows a cut-away sectional view taken at line 12—12 of FIG. 11.

Turning to FIGS. 9–12, the gripper assembly 10 is shown with a robotically-actuated hand assembly 50 for retrieving a cartridge C from a tape drive 52 in an automated storage library system. FIGS. 9 and 10 illustrate the gripper jaws 16,18 in the closed position for grasping the cartridge C, and FIGS. 11 and 12 illustrate the hand assembly 50 moving toward the tape drive 52 with the gripper arms 16,18 in the closed position prior to energizing for opening to grasp the cartridge C.

Accordingly, the gripper assembly 10 of the present invention provides an improved design in which cost, size, speed, simplicity, and flexibility are improved.

While the best mode for carrying out the invention has been described in detail, those familiar with the art to which this invention relates will recognize various alternative designs and embodiments for practicing the invention within the scope of the appended claims.

What is claimed is:

1. A gripper assembly, comprising:
   a frame;
   a rotary drive member secured to the frame;
   at least one gripper jaw movably connected to the frame for movement in opening and closing directions for gripping an object, said at least one gripper jaw including a cam surface;
   at least one follower driven by said rotary drive member and engaged with the respective cam surface for actuating jaw movement;
   wherein said at least one gripper jaw is spring-biased in the closing direction to provide a gripping force for gripping the object.

2. The gripper assembly of claim 1, wherein said rotary drive member comprises a rotary solenoid and said at least one gripper jaw is pivotally connected to the frame.

3. The gripper assembly of claim 1, wherein said rotary drive member comprises a rotary solenoid and said at least one follower comprises first and second rollers.

4. The gripper assembly of claim 3, wherein the rotary solenoid includes a drive axis, and the assembly further comprises first and second arms operatively connected to opposing ends of the rotary solenoid and a follower support rod connected to said first and second arms for carrying said first and second rollers, such that said rollers are pivotal about the drive axis.

5. The gripper assembly of claim 1, wherein said rotary drive member comprises a solenoid, and wherein said at least one gripper jaw comprises first and second gripper jaws, and said rotary driver member is operative to move the first and second gripper jaws in the opening direction when energized, and said spring bias secures the object between the first and second gripper jaws when the solenoid is de-energized.

6. The gripper assembly of claim 5, wherein said rotary drive member is a high speed solenoid operative to open the first and second gripper jaws in approximately 30 milliseconds.

7. A robotically-actuated hand assembly for retrieving and placing cartridges in a storage library system, the assembly comprising:
   a movable hand frame;
   a rotary solenoid secured to the hand frame;
   first and second gripper jaws movably connected to the hand frame for movement in opening and closing directions for gripping a cartridge, each said gripper jaw including a cam surface; and
   first and second followers driven by said rotary solenoid and engaged with the respective cam surface for actuating jaw movement.

8. The assembly of claim 7, wherein said first and second gripper jaws are spring-biased toward each other to provide a gripping force for gripping the cartridge.

9. The assembly of claim 8, wherein said rotary solenoid is operative to move the first and second gripper jaws in the opening direction when energized, and said spring bias secures the cartridge between the first and second gripper jaws when the solenoid is de-energized.

10. The assembly of claim 9, wherein said rotary solenoid is high speed solenoid operative to open the first and second gripper jaws in approximately 30 milliseconds.

11. The assembly of claim 7, wherein said frame, solenoid, gripper jaws and followers comprise a total thickness less than 2 inches when assembled.

12. The gripper assembly if claim 7, wherein said first and second gripper jaws are pivotally connected to the frame along a common axis.

13. The gripper assembly of claim 7, wherein said first and second followers comprise rollers.

14. The gripper assembly of claim 13, wherein the rotary solenoid includes a drive axis, and the assembly further comprises first and second arms operatively connected to opposing ends of the rotary solenoid and a follower support rod connected to said first and second arms for carrying said first and second rollers, such that said rollers are pivotal about the drive axis.

15. A gripper assembly, comprising:

a frame;

a rotary solenoid secured to the frame and having a drive axis;

at least one gripper jaw pivotally connected to the frame along a pivot axis perpendicular to the drive axis for movement in opening and closing directions for gripping an object, said gripper jaw including a cam surface;

at least one follower driven by said rotary solenoid and engaged with the respective cam surface for actuating jaw movement;

wherein said frame, rotary solenoid, gripper jaw and follower comprise a total thickness less than 2 inches when assembled.

16. The gripper assembly of claim 15, wherein said cam surface is integral with the respective gripper jaw.

* * * * *